United States Patent Office 3,188,305
Patented June 8, 1965

3,188,305
CROSSLINKING OF VINYL HALIDE RESINS
Moyer M. Safford, Schenectady, N.Y., assignor to General Electric Company, a corporation of New York
No Drawing. Filed Apr. 19, 1962, Ser. No. 188,844
6 Claims. (Cl. 260—92.8)

This invention is concerned with the curing or crosslinking of vinyl halide resins. More particularly, the invention relates to the crosslinking and thereby rendering infusible and insoluble a vinyl halide resin by using as the crosslinking agent from 0.25 to 6 percent, by weight, based on the weight of the vinyl halide resin, of a nitrogen compound selected from the class consisting of 2,2'-azobisisobutyronitrile having the formula (I)
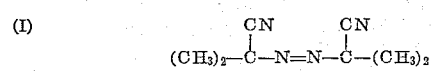

and p,p'-oxy-bis-(benzene sulfonyl hydrazide) having the formula (II)
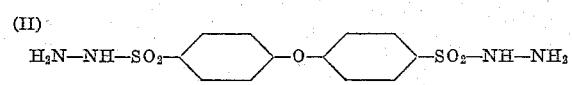

Vinyl halide resins in the past have been difficult to render insoluble because of the presence of the halogen. Thus, attempts to crosslink, for instance, polyvinyl chloride with the usual crosslinking agents, particularly free radical producers such as benzoyl peroxide, 2,2-(di-tertiary butyl peroxy)butane, tertiary butyl hydroperoxide, and di-tertiary butyl peroxide for the above purpose, have not produced any evidence of crosslinking of the vinyl halide resin. It was, therefore, entirely unexpected and in no way could it have been predicted that the use of a nitrogen compound of the above class (hereinafter referred to as "nitrogen compound") could effect the desired cross-linking and to render the vinyl halide resin insoluble in solvents in which the non-crosslinked vinyl halide resin is ordinarily soluble.

I am not unmindful of U.S. Patent 2,525,880, issued October 17, 1950, which discloses the use of the above azobisisobutyronitrile compound as a blowing agent for vinyl halide resins. However, it will be noted in this patent that the amount of blowing agent is described as being of the order of 12 to 40 percent, by weight, based on the weight of the vinyl halide resin. Furthermore, there is no recognition in this patent of the unusual and unexpected ability of the above class of nitrogen compounds of being capable of insolubilizing the vinyl halide resin.

The amount of nitrogen compound used for crosslinking purposes is within the range of from about 0.25 to 6 percent, by weight, based on the weight of the vinyl halide resin. By using this amount, the desired crosslinking effect is obtained without any undesirable porosity being introduced into the cured vinyl halide resin.

The term "vinyl halide resin" is intended to include such materials as polyvinyl chloride, polyvinyl bromide, etc.; polyvinyl halide compositions formed by the conjoint polymerization of vinyl halides such as vinyl chloride and another organic compound copolymerizable therewith, for example, copolymers of vinyl chloride and a vinyl ester of a saturated aliphatic monocarboxylic acid, e.g., vinyl acetate (such vinyl chloride-vinyl acetate copolymers being available under the trade name of "Vinylite resins" and wherein the vinyl chloride component is present in a preponderant amount, e.g., from 50 to 98 percent, by weight, of the total weight of the copolymerizable ingredients), vinyl butyrate, vinyl acetobutyrate, vinyl hexoate, copolymers of vinyl halide and vinylidene halides, specifically vinylidene chloride; copolymers of vinyl halides and vinyl ethers; copolymers of vinyl halides and vinyl ketones; copolymers of vinyl halides and itaconic esters; copolymers of vinyl halides and acrylic and alkacrylic compounds, etc.

The vinyl halide resins may have incorporated therein various plasticizers such as tricresyl phosphate, dibutyl phthalate, di-(2-ethylhexyl) phthalate, dibutyl sebacate, di(2-ethylhexyl) azelate, etc. The amount of plasticizer which may be used may be varied from about ½ to 2 parts, by weight, of the plasticizer to one part of the vinyl halide resin. Stated alternately, the amount of plasticizer employed may vary from about 20 percent to 66⅔ percent, by weight, based on the total weight of the vinyl halide resin and the plasticizer.

Various heat and light stabilizers may be added to the vinyl halide compositions. Among such stabilizers may be mentioned for example PbO, $Pb_2O_3$, $Pb_3O_4$, lead carbonate, as well as other compounds including those disclosed and claimed in Safford Patent 2,269,990, issued January 13, 1942, and assigned to the same assignee as the present invention.

Various fillers may also be added in amounts ranging from about 10 to 200 percent or more, by weight, based on the total weight of the filler and the vinyl halide resin. Among such fillers may be mentioned carbon black, barytes, zinc oxide, clay, wood flour, and other pigments and fillers commonly used in the rubber and plastics industries.

In order that those skilled in the art may better understand how the present invention may be practiced, the following examples are given by way of illustration and not by way of limitation. All parts are by weight.

Example 1

In this example, 50 parts gamma polyvinyl chloride 65 parts of di-(2-ethylhexyl)phthalate, 1.25 parts dibasic lead stearate, and 1 part of a heat stabilizer, specifically lead carbonate, and varying amounts (0.5, 1 and 3 parts) of 2,2'-azobisisobutyronitrile were compounded on a mill, and thereafter the various formulations were molded at 150° C. for about thirty minutes. As a control, a similar composition was molded with the exception that the azobisisobutyronitrile was omitted. Samples of each of the molded compositions were then placed in methyl ethyl ketone which is a notoriously good solvent for polyvinyl chloride. In the case where the azobisisobutyronitrile was incorporated in the formulation in the polyvinyl chloride, the cured samples merely swelled in the ketone and were substantially insolvent. In contrast to this, the control (without the nitrogen compound) dissolved quite readily to form essentially a homogeneous solution.

A sample of the above formulation containing 2.5 parts, by weight, of the azobisisobutyronitrile per 50 parts of polyvinyl chloride was cured as above and was then subjected to a flow test whereby the sample was heated under a load of 15 pounds per square inch for six minutes at a temperature of 125° C. A control which had not been cured with the azobisisobutyronitrile was also tested in the same manner. It was found that the sample which had been cured with the azobisisobutyronitrile showed only about 0.5 percent flow while the sample without the azobisisobutyronitrile showed a flow under these conditions of 28 percent.

Example 2

In this example, a formulation of 100 parts of polyvinyl chloride, 130 parts tricresyl phosphate, 2.5 parts dibasic lead stearate, 2 parts lead carbonate and 5 parts (5 percent) p,p'-oxy-bis-(benzene sulfonyl hydrazide) was milled as in Example 1, and the formulation was cured similarly as was done in Example 1 and tested in the same manner, and was found to be insoluble in acetone. The flow characteristics of the crosslinked cured polyvinyl chloride were essentially the same as the crosslinked polyvinyl chloride of Example 1 when subjected to the flow test described above.

Although polyvinyl chloride has been disclosed as the vinyl halide resin which may be employed in the practice of the present invention, it will be apparent that other vinyl halide resins, many examples of which have been given above, may be employed without departing from the scope of the invention. Also, the amount of ingredients which may be employed may be varied consistent with the limit that no more than 6 percent, by weight, of the nitrogen compound, based on the weight of the vinyl halide resin should be used for the above purpose. Other plasticizers in addition to those described in the previous examples may be employed as well as the other additives normally used with the vinyl halide resins.

The cured compositions of the above invention may be used in various applications, particularly in the preparation of insulated electrical cables either by taping or other methods employed in the art. Cured vinyl halide tapes can be wound around these insulated conductors to give heat-resistant insulated products having the additional advantage of being substantially insoluble in the usual solvents in which the thermoplastic vinyl halide resin is soluble. Alternatively, the compositions of the present invention may be extruded over electrically conducting cores and the insulated conductors can be subjected to elevated temperatures and pressures to effect conversion of the insulation to the crosslinked, substantially insoluble state. Solutions of the heat-curable composition comprising the vinyl halide resin and the aforesaid class of nitrogen compounds can be used to treat various materials, including heat-resistant cloths, such as glass cloth, asbestos cloth, etc., and mica flakes, which can then be compressed under heat and pressure to give a unitary structure in which the fillers are bonded by the heat resistant, substantially infusible and insoluble vinyl halide resin.

What I claim as new and desire to secure by Letters Patent of the United States is:

1. A composition of the matter comprising a vinyl chloride resin, a plasticizer therefor, and, as the sole curing agent for the vinyl chloride resin, from 0.25 to 6 percent, by weight, based on the weight of the vinyl halide resin, of a nitrogen compound selected from the class consisting of 2,2'-azobisisobutyronitrile and p,p-oxy-bis-(benzene sulfonyl hydrazide).

2. The heat cured composition of claim 1.

3. A composition of the matter comprising polyvinyl chloride, a plasticizer, and, as the sole curing agent for the polyvinyl chloride, from 0.25 to 6 percent, by weight, 2,2'-azobisisobutyronitrile, based on the weight of the polyvinyl chloride.

4. The heat-cured cross-linked composition of claim 3.

5. A composition of the matter comprising polyvinyl chloride, a plasticizer for the polyvinyl chloride, and from 0.25 to 6 percent, by weight, based on the weight of the polyvinyl chloride, of p,p-oxy-bis-(benzene sulfonyl hydrazide).

6. The heat-cured cross-linked composition of claim 5.

References Cited by the Examiner

UNITED STATES PATENTS

| 2,525,880 | 10/50 | Feldman | 260—2.5 |
| 2,958,672 | 11/60 | Goldberg | 260—92.8 |
| 2,616,888 | 11/62 | Comerford | 260—92.8 |

OTHER REFERENCES

Schildknecht: Polymer Processes, p. 619, Interscience (1956).

JOSEPH L. SCHOFER, *Primary Examiner.*

WILLIAM H. SHORT, *Examiner.*